United States Patent
Yu et al.

(10) Patent No.: US 11,373,564 B2
(45) Date of Patent: Jun. 28, 2022

(54) LOWER NARROW BORDER DISPLAY PANEL

(71) Applicant: Wuhan China Star Optoelectronics Semiconductor Display Technology Co., Ltd., Wuhan (CN)

(72) Inventors: Wenjing Yu, Wuhan (CN); Chihcheng Yen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/488,590

(22) PCT Filed: Apr. 17, 2019

(86) PCT No.: PCT/CN2019/082970
§ 371 (c)(1),
(2) Date: Aug. 25, 2019

(87) PCT Pub. No.: WO2020/155408
PCT Pub. Date: Aug. 6, 2020

(65) Prior Publication Data
US 2021/0366328 A1 Nov. 25, 2021

(30) Foreign Application Priority Data
Jan. 30, 2019 (CN) .......................... 201910089259.0

(51) Int. Cl.
*G09G 3/00* (2006.01)
*G02F 1/1362* (2006.01)

(52) U.S. Cl.
CPC ....... *G09G 3/006* (2013.01); *G02F 1/136254* (2021.01); *G02F 1/136286* (2013.01)

(58) Field of Classification Search
None
See application file for complete search history.

(56) References Cited

U.S. PATENT DOCUMENTS

| | | |
|---|---|---|
| 2004/0207108 A1 | 10/2004 | Jang et al. |
| 2007/0030408 A1 | 2/2007 | Lin et al. |
| 2011/0043500 A1 | 2/2011 | Kwak et al. |
| 2014/0354286 A1 | 12/2014 | Kim |
| 2015/0090961 A1* | 4/2015 | Lee .......................... H01L 51/52 257/40 |
| 2017/0046992 A1 | 2/2017 | Zhou |
| 2019/0130802 A1 | 5/2019 | Dai |

(Continued)

FOREIGN PATENT DOCUMENTS

| | | |
|---|---|---|
| CN | 1591028 A | 3/2005 |
| CN | 101191910 A | 6/2008 |
| CN | 102385828 A | 3/2012 |

(Continued)

*Primary Examiner* — Douglas X Rodriguez
(74) *Attorney, Agent, or Firm* — Nathan & Associates; Menachem Nathan

(57) ABSTRACT

Provided is a lower narrow border display panel, including a pixel unit, an array test unit and a cell test unit. By combining the array test circuit and the cell test circuit while ensuring the measurement, the space originally occupied by the array test circuit and the unit test circuit can be reduced, thereby narrowing the width of the lower border of the display panel.

19 Claims, 1 Drawing Sheet

(56) References Cited

U.S. PATENT DOCUMENTS

2020/0142270 A1    5/2020  Fujikawa

FOREIGN PATENT DOCUMENTS

| | | | |
|---|---|---|---|
| CN | 103268744 | A | 8/2013 |
| CN | 104992651 | A | 10/2015 |
| CN | 105975129 | A | 9/2016 |
| CN | 106200055 | A | 12/2016 |
| CN | 106526918 | A | 3/2017 |
| CN | 107578735 | A | 1/2018 |
| CN | 108700786 | A | 10/2018 |
| CN | 108806602 | A | 11/2018 |
| KR | 100864487 | B1 | 10/2008 |

* cited by examiner

LOWER NARROW BORDER DISPLAY PANEL

FIELD OF THE INVENTION

The present disclosure relates to a liquid crystal display field, and more particularly to a lower narrow border display panel.

BACKGROUND OF THE INVENTION

With the rise of the global information society, the demand for various display devices has been increased. Therefore, great efforts have been made in research and development of various flat display devices, such as Liquid Crystal Display (LCD), Plasma Display Panel (PDP), Electro Luminescences Display (ELD) and Vacuum Fluorescent Display (VFD).

While the display device is getting popular, the user does not only have higher and higher requirements on the types, the functions and the performance of the display device, but also has higher and higher requirements for the appearance of the display device. Conditions such as thinning of the display device and narrow borders are gradually becoming the factors for choosing the display device.

Among the many factors affecting the border of mobile phones, the driver integrated circuit plays an important role. At present, a common structure of a driving integrated circuit is to mount a driving integrated circuit on a polyimide substrate. An array test circuit and a cell test circuit for detecting the electrical properties of the entire display panel are placed directly between the input circuit and output circuit of the drive integrated circuit. As the border of the mobile phone is gradually narrowed, the size of the driving integrated circuit will be gradually reduced, and the remaining space is insufficient to place the array test circuit and the cell test circuit.

Accordingly, the display panel of the prior art has the problem that there is no spare space for placing the array test circuit and the cell test circuit. Therefore, there is a need to provide a lower narrow border display panel to improve this defect.

Technical Problem

At present, a common structure of a driving integrated circuit is to mount a driving integrated circuit on a polyimide substrate. An array test circuit and a cell test circuit for detecting the electrical properties of the entire display panel are placed directly between the input circuit and output circuit of the drive integrated circuit. As the border of the mobile phone is gradually narrowed, the size of the driving integrated circuit will be gradually reduced, and the remaining space is insufficient to place the array test circuit and the cell test circuit.

SUMMARY OF THE INVENTION

An objective of the present disclosure is to provide a narrow border display panel for solving the problem of the existing display panel that there is no spare space for placing the array test circuit and the cell test circuit.

The present disclosure provides a lower narrow border display panel, including:

a pixel unit;

an array test unit, including a plurality of array test switches and a plurality of array test pad; and a cell test unit, including a plurality of cell test switches;

wherein the array test unit is disposed between the pixel unit and the cell test unit, and ends of the plurality of array test switches are coupled to a plurality of data lines of the pixel unit, and the plurality of cell test switches are coupled to other ends of the plurality of array test switches.

According to one embodiment of the present disclosure, the plurality of array test switches are disposed between the pixel unit and the plurality of array test pads.

According to one embodiment of the present disclosure, the plurality of array test switches includes a plurality of first array test switches, a plurality of second array test switches, a plurality of third array test switches and a plurality of fourth array test switches, and the array test unit includes a first array test control signal line, a second array test control signal line, a third array test control signal line and a fourth array test control signal line, and gates of the plurality of first array test switches are coupled to the first array test control signal line, and gates of the plurality of second array test switches are coupled to the second array test control signal line, and gates of the plurality of third array test switches are coupled to the third array test control signal line, and gates of the plurality of fourth array test switches are coupled to the fourth array test control signal line.

According to one embodiment of the present disclosure, the plurality of cell test switches includes a plurality of first cell test switches, a plurality of second cell test switches, a plurality of third cell test switches and a plurality of fourth cell test switches, and the cell test unit includes a first cell test signal line, a second cell test signal line and a third cell test signal line, and drains of the plurality of first cell test switches are coupled to the first cell test signal line, and drains of the plurality of second cell test switches are coupled to the second cell test signal line, and drains of the plurality of third cell test switches are coupled to the third cell test signal line, and drains of the plurality of fourth cell test switches are coupled to the second cell test signal line.

According to one embodiment of the present disclosure, the cell test unit includes a cell test control signal line for providing a signal to turn on and turn off the plurality of unit test switches.

According to one embodiment of the present disclosure, gates of the plurality of cell test switches are all connected to the cell test control signal line.

According to one embodiment of the present disclosure, the cell test unit remains in an off state while performing an array test.

According to one embodiment of the present disclosure, the array test unit remains in an on state while performing a cell test.

According to one embodiment of the present disclosure, the pixel unit includes a plurality of first pixels, a plurality of second pixels and a plurality of third pixels.

According to one embodiment of the present disclosure, the first pixels and the second pixels are alternately arranged in a same column, and the third pixels are disposed in an adjacent column of the column where the first pixels and the second pixels are arranged.

The present disclosure further provides a lower narrow border display panel, including:

a pixel unit;

an array test unit, including a plurality of array test switches and a plurality of array test pad; and a cell test unit, including a plurality of cell test switches and a cell test control signal line, wherein the cell test control signal line is coupled to the cell test switches;

wherein the array test unit is disposed between the pixel unit and the cell test unit, and ends of the plurality of array test switches are coupled to a plurality of data lines of the pixel unit, and the plurality of cell test switches are coupled to other ends of the plurality of array test switches.

According to one embodiment of the present disclosure, the plurality of array test switches are disposed between the pixel unit and the plurality of array test pads.

According to one embodiment of the present disclosure, the plurality of array test switches includes a plurality of first array test switches, a plurality of second array test switches, a plurality of third array test switches and a plurality of fourth array test switches, and the array test unit includes a first array test control signal line, a second array test control signal line, a third array test control signal line and a fourth array test control signal line, and gates of the plurality of first array test switches are coupled to the first array test control signal line, and gates of the plurality of second array test switches are coupled to the second array test control signal line, and gates of the plurality of third array test switches are coupled to the third array test control signal line, and gates of the plurality of fourth array test switches are coupled to the fourth array test control signal line.

According to one embodiment of the present disclosure, the plurality of cell test switches includes a plurality of first cell test switches, a plurality of second cell test switches, a plurality of third cell test switches and a plurality of fourth cell test switches, and the cell test unit includes a first cell test signal line, a second cell test signal line and a third cell test signal line, and drains of the plurality of first cell test switches are coupled to the first cell test signal line, and drains of the plurality of second cell test switches are coupled to the second cell test signal line, and drains of the plurality of third cell test switches are coupled to the third cell test signal line, and drains of the plurality of fourth cell test switches are coupled to the second cell test signal line.

According to one embodiment of the present disclosure, the cell test unit remains in an off state while performing an array test.

According to one embodiment of the present disclosure, the array test unit remains in an on state while performing a cell test.

According to one embodiment of the present disclosure, the pixel unit includes a plurality of first pixels, a plurality of second pixels and a plurality of third pixels.

According to one embodiment of the present disclosure, the first pixels and the second pixels are alternately arranged in a same column, and the third pixels are disposed in an adjacent column of the column where the first pixels and the second pixels are arranged.

The present disclosure further provides a lower narrow border display panel, including:

a pixel unit, including a plurality of first pixels, a plurality of second pixels and a plurality of third pixels, wherein the first pixels and the second pixels are alternately arranged in a same column, and the third pixels are disposed in an adjacent column of the column where the first pixels and the second pixels are arranged;

an array test unit, including a plurality of array test switches and a plurality of array test pad; and a cell test unit, including a plurality of cell test switches and a cell test control signal line, wherein the cell test control signal line is coupled to the cell test switches;

wherein the array test unit is disposed between the pixel unit and the cell test unit, and the plurality of array test switches are disposed between the pixel unit and the plurality of array test pads, and ends of the plurality of array test switches are coupled to a plurality of data lines of the pixel unit, and the plurality of cell test switches are coupled to other ends of the plurality of array test switches.

According to one embodiment of the present disclosure, the plurality of array test switches are disposed between the pixel unit and the plurality of array test pads.

The benefits of the present disclosure are: in the embodiments of the present disclosure, the ends of the plurality of array test switches of the array test unit are coupled to the plurality of data lines of the pixel unit, and the plurality of cell test switches of the cell test unit are coupled to other ends of the plurality of array test switches. Thus, the array test unit and the cell test unit are combined. While ensuring the measurement, the space originally occupied by the array test circuit and the unit test circuit can be reduced, thereby narrowing the width of the lower border of the display panel.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

Figure 1:
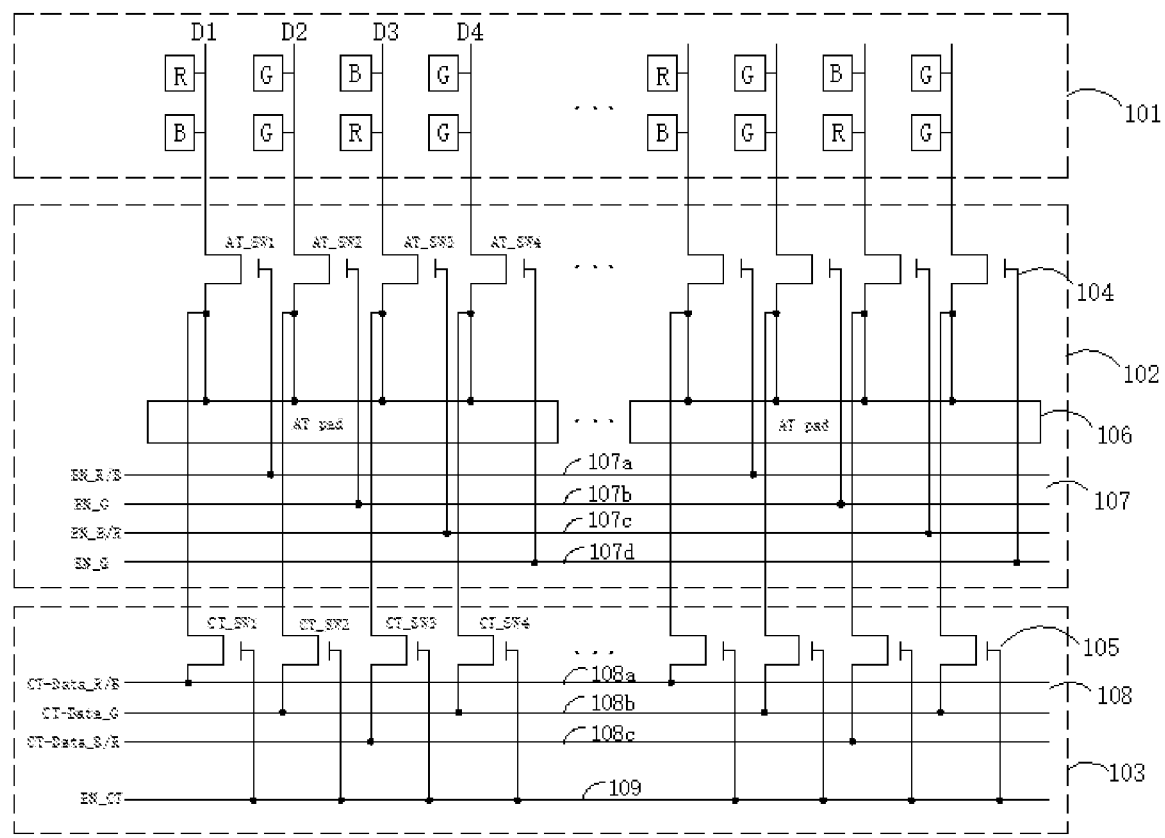
FIG. 1 is a structural diagram of a circuit according to an embodiment of the present disclosure.

The following descriptions for the respective embodiments are specific embodiments capable of being implemented for illustrations of the present application with referring to appended figures. The terms of up, down, front, rear, left, right, interior, exterior, side, etcetera mentioned in the present application are merely directions of referring to appended figures. Thus, the used directional terms are used to describe and understand the present application, but the present invention is not limited thereto. In the figure, units with similar structures are denoted by the same reference numerals.

The present disclosure will be further described in detail with the accompanying drawings and the specific embodiments.

Embodiment One

The embodiment of the present disclosure provides a lower narrow border display panel, which will be described in detail below with reference to FIGS. 1 to 2.

The embodiment of the present disclosure provides a lower narrow border display panel. As shown in FIG. 1, the lower narrow border display panel includes a pixel unit 101, an array test unit 102 and a cell test unit 103. The array test unit is disposed between the pixel unit 101 and the cell test unit 103.

The array test unit 102 is configured to detect whether a Thin Film Transistor (TFT) and a capacitor formed in pixels in the pixel unit 101 are defective. As performing the array test, the array test unit 102 receives an array test signal and an array test control signal, and selectively provides the array test signal to the pixel unit 101 corresponding to the array test control signal. The cell testing unit 103 is configured to detect a light emitting characteristic of the display panel. As performing the cell test, the cell test unit 103 receives a cell test signal and a cell test control signal, and selectively provides the cell test signal to the pixel unit 101 corresponding to the cell test control signal.

The array test unit 102 includes a plurality of array test switches 104, a plurality of array test pads 106 and a plurality of array test control signal lines 107. The cell test unit includes a plurality of cell test switches 105, a plurality of cell test signal lines 108 and a cell test control signal line 109. Ends of the plurality of array test switches 104 are coupled to a plurality of data lines of the pixel unit 101, and other ends of the plurality of array test switches 104 are coupled to the array test pads 106. The plurality of cell test switches 105 are coupled to the other end of the plurality of array test switches 104.

Preferably, the plurality of array test switches 104 are disposed between the pixel unit 101 and the array test pads 103.

In this embodiment, the plurality of array test switches 104 include: a plurality of first array test switches AT_SW1, a plurality of second array test switches AT_SW2, a plurality of third array test switches AT_SW3 and a plurality of fourth array test switches AT_SW4, and the array test unit further includes a first array test control signal line 107a, a second array test control signal line 107b, a third array test control signal line 107c and a fourth array test control signal line 107d, and gates of the plurality of first array test switches AT_SW1 are coupled to the first array test control signal line 107a, and the first array test control signal line 107a provides a control signal EN_R/B, and gates of the plurality of second array test switches AT_SW2 are coupled to the second array test control signal line 107b, and the second array test control signal line 107b provides a control signal EN_G, and gates of the plurality of third array test switches AT_SW3 are coupled to the third array test control signal line 107c, and the third array test control signal line 107c provides a control signal EN_B/R, and gates of the plurality of fourth array test switches AT_SW4 are coupled to the fourth array test control signal line 107d, and the fourth array test control signal line 107d provides a control signal EN_G.

Figure 2:
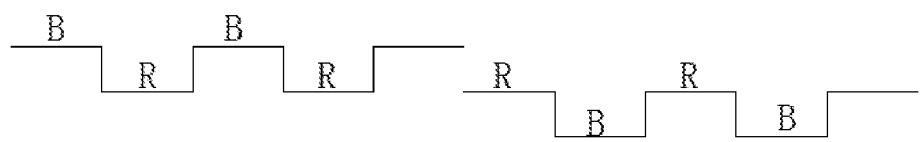
FIG. 2 is a diagram of an AC (Alternating current) signal of a GOA (Gate Driver On Array) according to an embodiment of the present disclosure.

As shown in FIG. 1, the plurality of cell test switches 105 include: a plurality of first cell test switches CT_SW1, a plurality of second cell test switches CT_SW2, a plurality of third cell test switches CT_SW3 and a plurality of fourth cell test switches CT_SW4, and the cell test unit further includes a first cell test signal line 108a, a second cell test signal line 108b and a third cell test signal line 108c, and drains of the plurality of first cell test switches CT_SW1 are coupled to the first cell test signal line 108a, and the first cell test signal line 108a provides a cell test signal CT_Data_R/B, and drains of the plurality of second cell test switches CT_SW2 are coupled to the second cell test signal line 108b, and the second cell test signal line 108b provides a cell test signal CT_Data_G, and drains of the plurality of third cell test switches CT_SW3 are coupled to the third cell test signal line 108c, and the third cell test signal line 108c provides a cell test signal CT_Data_B/R, and drains of the plurality of fourth cell test switches CT_SW4 are coupled to the second cell test signal line 108b.

As shown in FIG. 1, the cell test unit 103 includes a cell test control signal line 109. The cell test control signal line 109 is configured to provide a cell test control signal EN_CT to turn on or turn off the plurality of unit test switches 105. Gates of the plurality of cell test switches 105 are all coupled to the cell test control signal line 109.

Preferably, the cell test unit 103 remains in an off state while performing an array test. As shown in FIG. 1, in order to avoid a short circuit between the array test pad 106 and the plurality of data lines while performing an array test, the plurality of cell test signal lines 108 providing the cell test signals are turned off, and the plurality of first cell test switches CT_SW1, the plurality of second cell test switches CT_SW2, the plurality of third cell test switches CT_SW3 and the plurality of fourth cell test switches CT_SW4, which are coupled to the cell test control signal line 109 are also turned off. At this time, the circuits of the array test unit 102 remain in normal operation.

Preferably, the array test unit 102 remains in an on state while performing a cell test. As shown in FIG. 1, in order to allow the cell test signal to pass through the array test unit while performing a cell test, the plurality of first array test switches AT_SW1, the plurality of second array test switches AT_SW2, the plurality of third array test switches AT_SW3 and the plurality of fourth array test switches AT_SW4 are all turned on, and the array test pads 106 do not provide signals and the circuit of cell test unit 103 remains in normal operation.

In this embodiment as shown in FIG. 1, the pixel unit 101 includes a plurality of first pixels, a plurality of second pixels and a plurality of third pixels that emit respective different colors. The first pixels and the second pixels are alternately arranged in the same column, and the third pixels are aligned in an adjacent column of the column where the first pixels and the second pixels are arranged.

Preferably, as shown in FIG. 1, the first pixel is a red pixel R that emits red light, and the second pixel is a blue pixel B that emits blue light, and the third pixel is a green pixel G that emits green light. The red pixels R and the blue pixels B are alternately arranged in the same column. The green pixels G are aligned in the in adjacent columns D2 and D4 of the column where the red pixels R and the blue pixels B are arranged.

If the pixel arrangement order is the arrangement order shown in the preferred embodiment, the minimum pixel repeating unit is the pixels in two rows and four columns in the vertical direction perpendicular with the horizontal direction of the two rows. The light emitting pixel units of the first row is in order of RGBG. The light emitting pixel units of the second row is in order of BGRG. As shown in FIG. 2, if it is required to ensure that both the R pixel of the first row and the B pixel of the second row are illuminated, an alternating current signal as shown in FIG. 2 needs to be provided. The R pixel in the first row is illuminated. Then, the Gate Driver On Array (GOA) circuit signal is at a low level. The B pixel in the second row is illuminated. Then, the Gate Driver On Array (GOA) circuit signal is also at a low level.

In the embodiments of the present disclosure, the ends of the plurality of array test switches of the array test unit are coupled to the plurality of data lines of the pixel unit, and the plurality of cell test switches of the cell test unit are coupled to other ends of the plurality of array test switches. Thus, the array test unit and the cell test unit are combined. While ensuring the measurement, the space originally occupied by the array test circuit and the unit test circuit can be reduced, thereby narrowing the width of the lower border of the display panel.

Embodiment Two

The embodiment of the present disclosure provides a lower narrow border display panel, which will be described in detail below with reference to FIGS. 1 to 2.

The embodiment of the present disclosure provides a lower narrow border display panel. As shown in FIG. 1, the lower narrow border display panel includes a pixel unit 101, an array test unit 102 and a cell test unit 103. The array test unit is disposed between the pixel unit 101 and the cell test unit 103.

The array test unit 102 is configured to detect whether a Thin Film Transistor (TFT) and a capacitor formed in pixels in the pixel unit 101 are defective. As performing the array test, the array test unit 102 receives an array test signal and an array test control signal, and selectively provides the array test signal to the pixel unit 101 corresponding to the array test control signal. The cell testing unit 103 is configured to detect a light emitting characteristic of the display panel. As performing the cell test, the cell test unit 103 receives a cell test signal and a cell test control signal, and selectively provides the cell test signal to the pixel unit 101 corresponding to the cell test control signal.

The array test unit 102 includes a plurality of array test switches 104, a plurality of array test pads 106 and a plurality of array test control signal lines 107. The cell test unit includes a plurality of cell test switches 105, a plurality of cell test signal lines 108 and a cell test control signal line 109. The cell test control signal line 109 is configured to provide a cell test control signal EN_CT to turn on or turn off the plurality of unit test switches 105. Gates of the plurality of cell test switches 105 are all coupled to the cell test control signal line 109. Ends of the plurality of array test switches 104 are coupled to a plurality of data lines of the pixel unit 101, and other ends of the plurality of array test switches 104 are coupled to the array test pads 106. The plurality of cell test switches 105 are coupled to the other end of the plurality of array test switches 104.

Preferably, the plurality of array test switches 104 are disposed between the pixel unit 101 and the array test pads 103.

In this embodiment, the plurality of array test switches 104 include: a plurality of first array test switches AT_SW1, a plurality of second array test switches AT_SW2, a plurality of third array test switches AT_SW3 and a plurality of fourth array test switches AT_SW4, and the array test unit further includes a first array test control signal line 107a, a second array test control signal line 107b, a third array test control signal line 107c and a fourth array test control signal line 107d, and gates of the plurality of first array test switches AT_SW1 are coupled to the first array test control signal line 107a, and the first array test control signal line 107a provides a control signal EN_R/B, and gates of the plurality of second array test switches AT_SW2 are coupled to the second array test control signal line 107b, and the second array test control signal line 107b provides a control signal EN_G, and gates of the plurality of third array test switches AT_SW3 are coupled to the third array test control signal line 107c, and the third array test control signal line 107c provides a control signal EN_B/R, and gates of the plurality of fourth array test switches AT_SW4 are coupled to the fourth array test control signal line 107d, and the fourth array test control signal line 107d provides a control signal EN_G.

As shown in FIG. 1, the plurality of cell test switches 105 include: a plurality of first cell test switches CT_SW1, a plurality of second cell test switches CT_SW2, a plurality of third cell test switches CT_SW3 and a plurality of fourth cell test switches CT_SW4, and the cell test unit further includes a first cell test signal line 108a, a second cell test signal line 108b and a third cell test signal line 108c, and drains of the plurality of first cell test switches CT_SW1 are coupled to the first cell test signal line 108a, and the first cell test signal line 108a provides a cell test signal CT_Data_R/B, and drains of the plurality of second cell test switches CT_SW2 are coupled to the second cell test signal line 108b, and the second cell test signal line 108b provides a cell test signal CT_Data_G, and drains of the plurality of third cell test switches CT_SW3 are coupled to the third cell test signal line 108c, and the third cell test signal line 108c provides a cell test signal CT_Data_B/R, and drains of the plurality of fourth cell test switches CT_SW4 are coupled to the second cell test signal line 108b.

Preferably, the cell test unit 103 remains in an off state while performing an array test. As shown in FIG. 1, in order to avoid a short circuit between the array test pad 106 and the plurality of data lines while performing an array test, the plurality of cell test signal lines 108 providing the cell test signals are turned off, and the plurality of first cell test switches CT_SW1, the plurality of second cell test switches CT_SW2, the plurality of third cell test switches CT_SW3 and the plurality of fourth cell test switches CT_SW4, which are coupled to the cell test control signal line 109 are also turned off. At this time, the circuits of the array test unit 102 remain in normal operation.

Preferably, the array test unit 102 remains in an on state while performing a cell test. As shown in FIG. 1, in order to allow the cell test signal to pass through the array test unit while performing a cell test, the plurality of first array test switches AT_SW1, the plurality of second array test switches AT_SW2, the plurality of third array test switches AT_SW3 and the plurality of fourth array test switches AT_SW4 are all turned on, and the array test pads 106 do not provide signals and the circuit of cell test unit 103 remains in normal operation.

In this embodiment as shown in FIG. 1, the pixel unit 101 includes a plurality of first pixels, a plurality of second pixels and a plurality of third pixels that emit respective different colors. The first pixels and the second pixels are alternately arranged in the same column, and the third pixels are aligned in an adjacent column of the column where the first pixels and the second pixels are arranged.

Preferably, as shown in FIG. 1, the first pixel is a red pixel R that emits red light, and the second pixel is a blue pixel B that emits blue light, and the third pixel is a green pixel G that emits green light. The red pixels R and the blue pixels B are alternately arranged in the same column. The green pixels G are aligned in the in adjacent columns D2 and D4 of the column where the red pixels R and the blue pixels B are arranged.

If the pixel arrangement order is the arrangement order shown in the preferred embodiment, the minimum pixel repeating unit is the pixels in two rows and four columns in the vertical direction perpendicular with the horizontal direction of the two rows. The light emitting pixel units of the first row is in order of RGBG. The light emitting pixel units of the second row is in order of BGRG. As shown in FIG. 2, if it is required to ensure that both the R pixel of the first row and the B pixel of the second row are illuminated, an alternating current signal as shown in FIG. 2 needs to be provided. The R pixel in the first row is illuminated. Then, the Gate Driver On Array (GOA) circuit signal is at a low level. The B pixel in the second row is illuminated. Then, the Gate Driver On Array (GOA) circuit signal is also at a low level.

Embodiment Three

The embodiment of the present disclosure provides a lower narrow border display panel, which will be described in detail below with reference to FIGS. 1 to 2.

The embodiment of the present disclosure provides a lower narrow border display panel. As shown in FIG. 1, the lower narrow border display panel includes a pixel unit 101, an array test unit 102 and a cell test unit 103. The array test unit is disposed between the pixel unit 101 and the cell test unit 103.

The array test unit 102 is configured to detect whether a Thin Film Transistor (TFT) and a capacitor formed in pixels in the pixel unit 101 are defective. As performing the array test, the array test unit 102 receives an array test signal and an array test control signal, and selectively provides the array test signal to the pixel unit 101 corresponding to the array test control signal. The cell testing unit 103 is configured to detect a light emitting characteristic of the display panel. As performing the cell test, the cell test unit 103 receives a cell test signal and a cell test control signal, and selectively provides the cell test signal to the pixel unit 101 corresponding to the cell test control signal.

The array test unit 102 includes a plurality of array test switches 104, a plurality of array test pads 106 and a plurality of array test control signal lines 107. The cell test unit includes a plurality of cell test switches 105, a plurality of cell test signal lines 108 and a cell test control signal line 109. The cell test control signal line 109 is configured to provide a cell test control signal EN_CT to turn on or turn off the plurality of unit test switches 105. Gates of the plurality of cell test switches 105 are all coupled to the cell test control signal line 109. Ends of the plurality of array test switches 104 are coupled to a plurality of data lines of the pixel unit 101, and other ends of the plurality of array test switches 104 are coupled to the array test pads 106. The plurality of cell test switches 105 are coupled to the other end of the plurality of array test switches 104.

In this embodiment, the pixel unit 101 includes a plurality of first pixels, a plurality of second pixels and a plurality of third pixels that emit respective different colors. The first pixels and the second pixels are alternately arranged in the same column, and the third pixels are aligned in an adjacent column of the column where the first pixels and the second pixels are arranged.

Preferably, the plurality of array test switches 104 are disposed between the pixel unit 101 and the array test pads 103.

In the embodiments of the present disclosure, the ends of the plurality of array test switches 104 of the array test unit 102 are coupled to the plurality of data lines of the pixel unit 101, and the plurality of cell test switches 105 of the cell test unit 103 are coupled to other ends of the plurality of array test switches 104. Thus, the array test unit and the cell test unit are combined. While ensuring the measurement, the space originally occupied by the array test circuit and the unit test circuit can be reduced, thereby narrowing the width of the lower border of the display panel.

In summary, although the above preferred embodiments of the present disclosure are disclosed, the foregoing preferred embodiments are not intended to limit the disclosure, those skilled in the art can make various kinds of alterations and modifications without departing from the spirit and scope of the present disclosure. Thus, the scope of protection of the present application is defined by the scope of the claims.

What is claimed is:

1. A lower narrow border display panel, including:
   a pixel unit;
   an array test unit, including a plurality of array test switches, a plurality of array test control signal lines, and a plurality of array test pads; and
   a cell test unit, including a plurality of cell test switches;
   wherein the array test unit is disposed between the pixel unit and the cell test unit,
   wherein drains of plurality of array test switches are directly coupled to the pixel unit; gates of the plurality of array test switches are directly coupled to the plurality of array test control signal lines, respectively; and sources of the plurality of array test switches are directly coupled to the plurality of array test pads, respectively;
   wherein drains of the plurality of cell test switches are directly coupled to the sources of the plurality of array test switches, respectively.

2. The lower narrow border display panel according to claim 1, wherein the plurality of array test switches are disposed between the pixel unit and the plurality of array test pads.

3. The lower narrow border display panel according to claim 1, wherein the plurality of array test switches includes a plurality of first array test switches, a plurality of second array test switches, a plurality of third array test switches and a plurality of fourth array test switches, and the plurality of array test control signal lines includes a first array test control signal line, a second array test control signal line, a third array test control signal line and a fourth array test control signal line, and gates of the plurality of first array test switches are coupled to the first array test control signal line, and gates of the plurality of second array test switches are coupled to the second array test control signal line, and gates of the plurality of third array test switches are coupled to the third array test control signal line, and gates of the plurality of fourth array test switches are coupled to the fourth array test control signal line.

4. The lower narrow border display panel according to claim 3, wherein the plurality of cell test switches includes a plurality of first cell test switches, a plurality of second cell test switches, a plurality of third cell test switches and a plurality of fourth cell test switches, and the cell test unit includes a first cell test signal line, a second cell test signal line and a third cell test signal line, and drains of the plurality of first cell test switches are coupled to the first cell test signal line, and drains of the plurality of second cell test switches are coupled to the second cell test signal line, and drains of the plurality of third cell test switches are coupled to the third cell test signal line, and drains of the plurality of fourth cell test switches are coupled to the second cell test signal line.

5. The lower narrow border display panel according to claim 1, wherein the cell test unit includes a cell test control signal line for providing a signal to turn on and turn off the plurality of unit test switches.

6. The lower narrow border display panel according to claim 5, wherein gates of the plurality of cell test switches are all connected to the cell test control signal line.

7. The lower narrow border display panel according to claim 1, wherein the cell test unit remains in an off state while performing an array test.

8. The lower narrow border display panel according to claim 7, wherein the array test unit remains in an on state while performing a cell test.

9. The lower narrow border display panel according to claim 1, wherein the pixel unit includes a plurality of first pixels, a plurality of second pixels and a plurality of third pixels.

10. The lower narrow border display panel according to claim 9, wherein the first pixels and the second pixels are alternately arranged in a same column, and the third pixels are disposed in an adjacent column of the column where the first pixels and the second pixels are arranged.

11. A lower narrow border display panel, including:
a pixel unit;
an array test unit, including a plurality of array test switches, a plurality of array test control signal lines, and a plurality of array test pads; and
a cell test unit, including a plurality of cell test switches and a cell test control signal line, wherein the cell test control signal line is coupled to the cell test switches;
wherein the array test unit is disposed between the pixel unit and the cell test unit
wherein drains of plurality of array test switches are directly coupled to the pixel unit; gates of the plurality of array test switches are directly coupled to the plurality of array test control signal lines, respectively; and sources of the plurality of array test switches are directly coupled to the plurality of array test pads, respectively;
wherein drains of the plurality of cell test switches are directly coupled to the sources of the plurality of array test switches, respectively.

12. The lower narrow border display panel according to claim 11, wherein the plurality of array test switches are disposed between the pixel unit and the plurality of array test pads.

13. The lower narrow border display panel according to claim 11, wherein the plurality of array test switches includes a plurality of first array test switches, a plurality of second array test switches, a plurality of third array test switches and a plurality of fourth array test switches, and the plurality of array test control signal lines includes a first array test control signal line, a second array test control signal line, a third array test control signal line and a fourth array test control signal line, and gates of the plurality of first array test switches are coupled to the first array test control signal line, and gates of the plurality of second array test switches are coupled to the second array test control signal line, and gates of the plurality of third array test switches are coupled to the third array test control signal line, and gates of the plurality of fourth array test switches are coupled to the fourth array test control signal line.

14. The lower narrow border display panel according to claim 13, wherein the plurality of cell test switches includes a plurality of first cell test switches, a plurality of second cell test switches, a plurality of third cell test switches and a plurality of fourth cell test switches, and the cell test unit includes a first cell test signal line, a second cell test signal line and a third cell test signal line, and drains of the plurality of first cell test switches are coupled to the first cell test signal line, and drains of the plurality of second cell test switches are coupled to the second cell test signal line, and drains of the plurality of third cell test switches are coupled to the third cell test signal line, and drains of the plurality of fourth cell test switches are coupled to the second cell test signal line.

15. The lower narrow border display panel according to claim 11, wherein the cell test unit remains in an off state while performing an array test.

16. The lower narrow border display panel according to claim 15, wherein the array test unit remains in an on state while performing a cell test.

17. The lower narrow border display panel according to claim 11, wherein the pixel unit includes a plurality of first pixels, a plurality of second pixels and a plurality of third pixels.

18. The lower narrow border display panel according to claim 17, wherein the first pixels and the second pixels are alternately arranged in a same column, and the third pixels are disposed in an adjacent column of the column where the first pixels and the second pixels are arranged.

19. A lower narrow border display panel, including:
a pixel unit, including a plurality of first pixels, a plurality of second pixels and a plurality of third pixels, wherein the first pixels and the second pixels are alternately arranged in a same column, and the third pixels are disposed in an adjacent column of the column where the first pixels and the second pixels are arranged;
an array test unit, including a plurality of array test switches, a plurality of array test control signal lines, and a plurality of array test pad; and
a cell test unit, including a plurality of cell test switches and a cell test control signal line, wherein the cell test control signal line is coupled to the cell test switches;
wherein the array test unit is disposed between the pixel unit and the cell test unit,
wherein drains of plurality of array test switches are directly coupled to the pixel unit; gates of the plurality of array test switches are directly coupled to the plurality of array test control signal lines, respectively; and sources of the plurality of array test switches are directly coupled to the plurality of array test pads, respectively;
wherein drains of the plurality of cell test switches are directly coupled to the sources of the plurality of array test switches, respectively.

* * * * *